(12) United States Patent
Song et al.

(10) Patent No.: US 8,384,854 B2
(45) Date of Patent: Feb. 26, 2013

(54) LIQUID CRYSTAL DISPLAY APPARATUS HAVING GRIDS

(75) Inventors: Young-Woo Song, Suwon-si (KR);
Jong-Hyuk Lee, Suwon-si (KR);
Kyu-Hwan Hwang, Suwon-si (KR);
Jong-Seok Oh, Suwon-si (KR);
Joon-Gu Lee, Suwon-si (KR);
Jae-Heung Ha, Suwon-si (KR);
Chul-Woo Park, Suwon-si (KR)

(73) Assignee: Samsung Display Co., Ltd.,
Giheung-Gu, Yongin, Gyeonggi-Do (KR)

( * ) Notice: Subject to any disclaimer, the term of this patent is extended or adjusted under 35 U.S.C. 154(b) by 619 days.

(21) Appl. No.: 12/385,972

(22) Filed: Apr. 24, 2009

(65) Prior Publication Data

US 2009/0273728 A1    Nov. 5, 2009

(30) Foreign Application Priority Data

Apr. 30, 2008    (KR) .................. 10-2008-0040803

(51) Int. Cl.
*G02F 1/1335* (2006.01)
(52) U.S. Cl. ............. 349/96; 349/62; 349/113; 349/117
(58) Field of Classification Search .................. 349/62, 349/96, 113, 117
See application file for complete search history.

(56) References Cited

U.S. PATENT DOCUMENTS

| | | | | |
|---|---|---|---|---|
| 5,305,143 A * | 4/1994 | Taga et al. | ................. | 359/485.01 |
| 5,445,898 A * | 8/1995 | Budzilek et al. | ............. | 428/690 |
| 6,398,364 B1 * | 6/2002 | Bryars | ............................ | 353/31 |
| 7,466,484 B2 * | 12/2008 | Mi et al. | .................... | 359/485.05 |
| 7,772,768 B2 * | 8/2010 | Oh et al. | ........................ | 313/506 |
| 2001/0030721 A1 | 10/2001 | Z. et al. | | |
| 2003/0156088 A1 | 8/2003 | Maeda | | |
| 2004/0264350 A1 * | 12/2004 | Ueki et al. | ............... | 369/112.16 |
| 2006/0127829 A1 | 6/2006 | Deng et al. | | |
| 2006/0215263 A1 | 9/2006 | Mi et al. | | |
| 2007/0047214 A1 | 3/2007 | Nesterenko et al. | | |
| 2007/0285598 A1 | 12/2007 | Hwang et al. | | |
| 2008/0002554 A1 * | 1/2008 | Nagata et al. | ............ | 369/112.16 |

(Continued)

FOREIGN PATENT DOCUMENTS

| | | |
|---|---|---|
| CN | 1304130 A | 7/2001 |
| CN | 1304130 A * | 7/2001 |

(Continued)

OTHER PUBLICATIONS

Partial Extended European Search report issued by European Patent Office on Aug. 18, 2009, corresponding to European Patent Application No. 09251229.2.

(Continued)

*Primary Examiner* — Mike Qi
(74) *Attorney, Agent, or Firm* — Robert E. Bushnell, Esq.

(57) ABSTRACT

A liquid crystal display apparatus includes a backlight unit, a second polarization layer, a liquid crystal layer disposed between the backlight unit and the second polarization layer, a first polarization layer disposed between the backlight unit and the liquid crystal layer. In an embodiment, a surface of the first polarization layer facing the backlight unit includes a reflective surface and a surface of the first polarization layer facing the backlight unit includes an absorbent surface. In another embodiment, the first polarization layer includes grids, which include a metal, and absorbing members, which include dielectric materials. In another embodiment, the first polarization layer includes grids, each of which includes a first component including a dielectric material and a second component including a metal.

8 Claims, 9 Drawing Sheets

U.S. PATENT DOCUMENTS

2008/0048558 A1    2/2008    Song et al.
2008/0094547 A1    4/2008    Sugita et al.
2009/0153961 A1*   6/2009    Murakami et al. ............ 359/486

FOREIGN PATENT DOCUMENTS

| CN | 1576907 A | 2/2005 |
| CN | 101106181 A | 1/2008 |
| EP | 1245994 A1 | 10/2002 |
| JP | 10-96915 A | 4/1998 |
| JP | 2005-37900 A | 2/2005 |
| KR | 1020010080974 A | 8/2001 |

OTHER PUBLICATIONS

Full Extended European Search issued by European Patent Office on Nov. 4, 2009, corresponding to European Patent Application No. 09251229.2

Korean Office Action dated Oct. 31, 2009, corresponding to Korean Patent Application No. 10-2008-0040803.

European Office Action issued by European Patent Office on Feb. 24, 2011, corresponding to European Patent Application No. 09 251 229.2-2205 attached herewith.

The Japanese Office action issued by Japanese Patent Office on Jul. 12, 2011, corresponding to JP 2009-105473 and Request for Entry attached herewith.

Chinese Office action issued by Chinese Patent Office on Jan. 13, 2012, corresponding to CN 200910138113.7 and Request for Entry attached herewith.

Chinese Office action issued by SIPO on Nov. 29, 2012 in connection with Chinese Patent Application No. 200910138113.7 and Request for Entry attached herewith.

* cited by examiner

LIQUID CRYSTAL DISPLAY APPARATUS HAVING GRIDS

CLAIM OF PRIORITY

This application makes reference to, incorporates the same herein, and claims all benefits accruing under 35 U.S.C. §119 from an application for LIQUID CRYSTAL DISPLAY APPARATUS earlier filed in the Korean Intellectual Property Office on the 30th of Apr. 2008 and there duly assigned Serial No. 10-2008-0040803.

BACKGROUND OF THE INVENTION

1. Field of the Invention

The present invention relates to a liquid crystal display apparatus, and more particularly, to a liquid crystal display apparatus that improves contrast and light efficiency.

2. Description of the Related Art

Recently, existing display apparatuses have been replaced by portable thin flat panel display apparatuses. Among flat panel display apparatuses, liquid crystal display apparatuses have the advantage of low power consumption, and thus have been spotlighted as next generation display apparatuses. Also, liquid crystal display apparatuses have the advantage of low radiation of electromagnetic waves that are harmful to the human body.

However, liquid crystal display apparatuses are not self-emitting flat panel display apparatuses, and thus produce an image by using a separate light source, e.g., a backlight unit. However, backlight units have low light efficiency because an amount of light generated by a backlight unit is lost while being transmitted through a liquid crystal layer. In particular, light loss further increases due to a polarization layer disposed between the backlight unit and the liquid crystal layer.

In order to improve light efficiency, a reflective polarization plate may be used. However, in this case, contrast is reduced.

SUMMARY OF THE INVENTION

The present invention provides a liquid crystal display apparatus that can improve contrast and light efficiency by disposing a polarization layer having a reflective surface and an absorbent surface between a liquid crystal layer and a backlight unit.

According to an aspect of the present invention, there is provided a liquid crystal display apparatus comprising a backlight unit, a second polarization layer, a liquid crystal layer disposed between the backlight unit and the second polarization layer, and a first polarization layer disposed between the backlight unit and the liquid crystal layer. A surface of the first polarization layer facing the backlight unit includes a reflective surface that reflects light, and an another surface of the first polarization layer facing the liquid crystal layer includes an absorbent surface that absorbs light.

The liquid crystal display apparatus may further comprise a reflective layer. The backlight unit is disposed between the reflective layer and the first polarization layer.

The liquid crystal display apparatus may further comprise a quarter wavelength retardation layer disposed between the reflective layer and the backlight unit.

According to another aspect of the present invention, there is provided a liquid crystal display apparatus comprising a backlight unit, a second polarization layer, a liquid crystal layer disposed between the backlight unit and the second polarization layer, and a first polarization layer disposed between the backlight unit and the liquid crystal layer. The first polarization layer comprises a plurality of grids including a metal, and a plurality of absorbing members including a dielectric material. The absorbing members are disposed closer than the grids to the liquid crystal layer.

Each of the absorbing members may be disposed between the liquid crystal layer and one of the grids.

Each of the absorbing members may be formed of a material comprising CdSe, CdTe, or ruthenium. Each of the absorbing members may comprise an organic material. Each of the absorbing members may comprise an inorganic material. Each of the absorbing members may further comprise a metal, and the metal and the dielectric material may be mixed with each other.

According to another aspect of the present invention, there is provided a liquid crystal display apparatus comprising a backlight unit, a second polarization layer, a liquid crystal layer disposed between the backlight unit and the second polarization layer, and a first polarization layer disposed between the backlight unit and the liquid crystal layer. The first polarization layer comprises a plurality of grids. Each of the grids comprises a first component including a dielectric material, and a second component including a metal. The concentration of the first component increases while proceeding toward the liquid crystal layer, and the concentration of the second component increases while proceeding toward the backlight unit.

The first component may comprise one selected from the group consisting of SiOx (x≧1), SiNx (x≧1), $MgF_2$, $CaF_2$, $Al_2O_3$, $SnO_2$, ITO (indium tin oxide), IZO (indium zinc oxide), ZnO, and $In_2O_3$. The second component may comprise one selected from the group consisting of Fe, Co, V, Ti, Al, Ag, Si, Cr, Mo, Ge, Y, Zn, Zr, W, Ta, Cu, and Pt.

The grids may be patterned into stripes that are arranged at predetermined intervals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings, in which exemplary embodiments of the invention are shown.

Figure 1:
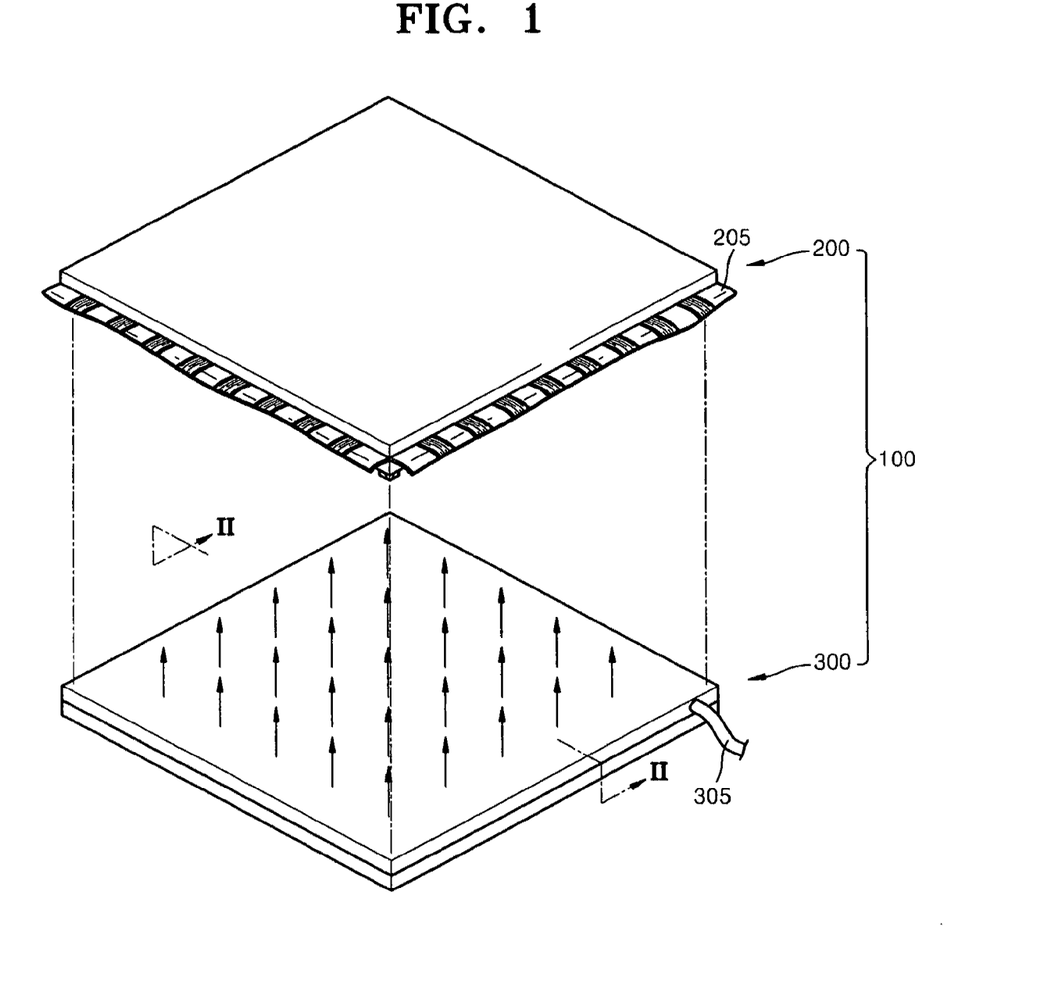
FIG. 1 is a perspective view of a liquid crystal display apparatus according to an embodiment of the present invention.
Figure 2:
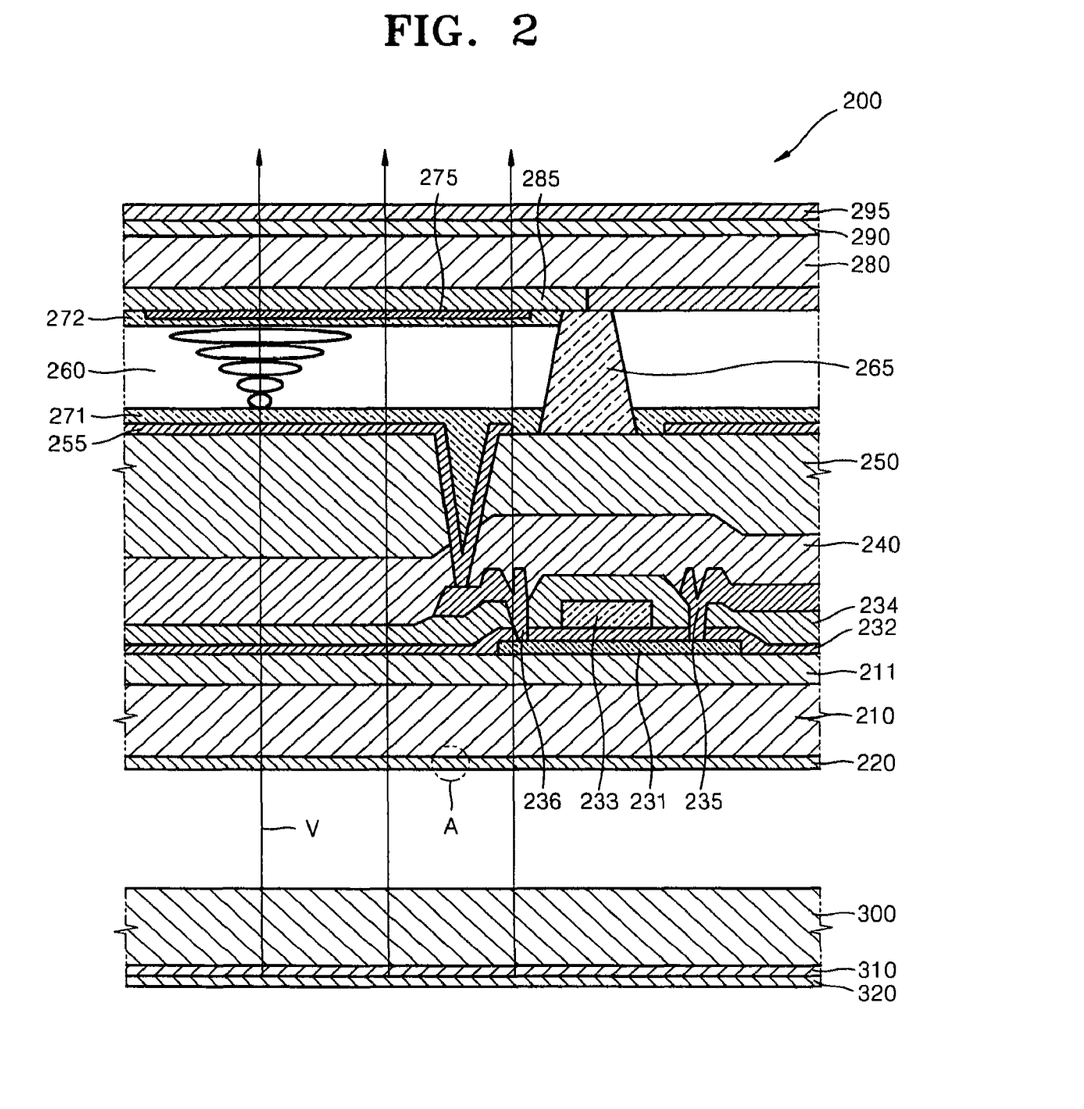
FIG. 2 is a cross-sectional view taken along line II-II of FIG. 1.
Figure 3:
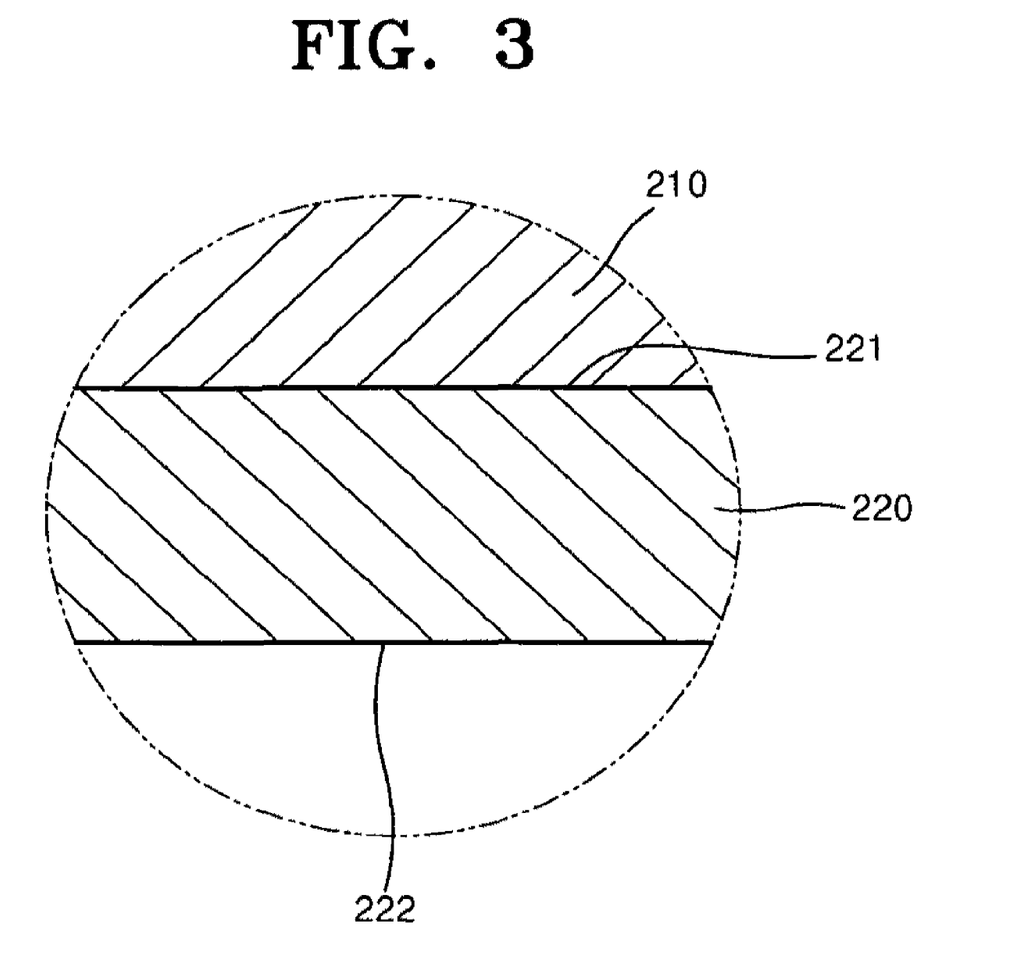
FIG. 3 is an enlarged view of portion A of FIG. 2.

FIG. 1 is a perspective view of a liquid crystal display apparatus 100 according to an embodiment of the present invention. FIG. 2 is a cross-sectional view taken along line II-II of FIG. 1. FIG. 3 is an enlarged view of portion A of FIG. 2.

Referring to FIGS. 1 and 2, the liquid crystal display apparatus 100 includes a backlight unit 300, a liquid crystal layer 260, a first polarization layer 220, and a second polarization layer 290.

Referring to FIGS. 1 and 2, the liquid crystal display apparatus 100 also can be described to include a liquid crystal display panel 200 and a backlight unit 300 supplying light to the liquid crystal display panel 200. A flexible printed circuit (FPC) board 205 for transmitting an image signal is attached to the liquid crystal display panel 200. The backlight unit 300 is disposed at the back of the liquid crystal display panel 200.

The backlight unit 300 is supplied with power through a connection cable 305, and emits light through a front surface of the backlight unit 300. The light emitted by the backlight unit 300 is marked with arrows in FIGS. 1 and 2. The light emitted by the backlight unit 300 is supplied to the liquid crystal display panel 200.

A reflective layer 320 is disposed on a rear surface of the backlight unit 300 that is opposite to the front surface of the backlight unit 300 facing the liquid crystal layer 260. The reflective layer 320 reflects light emitted by the backlight unit 300 toward the liquid crystal display layer 260, thereby improving light efficiency. A quarter wavelength retardation layer 310 is disposed between the reflective layer 320 and the backlight unit 300.

The liquid crystal display panel 200 includes the liquid crystal layer 260, and the first polarization layer 220 and the second polarization layer 290 disposed on each end of the liquid crystal layer 260, respectively. A detailed explanation of the liquid crystal display panel 200 will now be presented with reference to FIG. 2. The liquid crystal display panel 200 includes a first substrate 210. The first substrate 210 is a transparent substrate. The first substrate 210 may be formed of a transparent glass material having $SiO_2$ as a main component, or formed of a transparent plastic material.

The first polarization layer 220 is formed on a surface of the first substrate 210 facing the backlight unit 300. A detailed construction of the first polarization layer 220 is illustrated in FIG. 3 that is an enlarged view of the portion A of FIG. 2. The first polarization layer 220 has an absorbent surface 221 and a reflective surface 222. The reflective surface 222 of the first polarization layer 220 faces the backlight unit 300, and the absorbent surface 221 of the first polarization layer 220, which is opposite to the surface of the first polarization layer 220 facing the backlight unit 300, faces the first substrate 210.

The first polarization layer 220 may be formed by applying a reflective material to form the reflective surface 222, by applying an absorbent material to form the absorbent surface 221, and by patterning both the reflective material and the absorbent material. However, the present invention is not limited thereto, and the first polarization layer 220 may be formed by forming the absorbent surface 221 and doping a reflective material on a surface of the absorbent surface 221 to from the reflective surface 222, or may be formed by using other methods.

A buffer layer 211 is formed on a surface of the first substrate 210 opposite to the surface of the first substrate 210 on which the first polarization layer 220 is formed. The buffer layer 211 is used to maintain the smoothness of the first substrate 210 and prevent impurities from leaking. The buffer layer 211 may be formed of $SiO_2$ and/or SiNx.

An active layer 231 may be formed on the buffer layer 211 in a predetermined pattern. A gate insulating layer 232 is formed on the active layer 231, and a gate electrode 233 is formed on the gate insulating layer 232 in a predetermined pattern. An inter-layer insulating layer 234 is formed on the gate electrode 233 to cover the gate electrode 233. Next, the gate insulating layer 232 and the inter-layer insulating layer 234 are etched by dry etching or the like to form contact holes through which portions of the active layer 231 are exposed. A source electrode 235 and a drain electrode 236 are formed such that the source electrode 235 and the drain electrode 236 are electrically connected to the active layer 231 through the contact holes. A passivation layer 240 is formed to cover the source electrode 235 and the drain electrode 236, and a planarization layer 250 is formed on the passivation layer 240. The planarization layer 250 and the passivation layer 240 are etched to form a first electrode 255 in a predetermined pattern such that the first electrode 255 is electrically connected to the source electrode 235 or the drain electrode 236.

A second substrate 280 is disposed to face the first substrate 210. The second substrate 280 is formed of a transparent material like the first substrate 210. The liquid crystal layer 260 is disposed between the first substrate 210 and the second substrate 280. A color filter layer 285 is formed on a bottom surface of the second substrate 280. A second electrode 275 is formed on a bottom surface of the color filter layer 285. A first alignment layer 271 and a second alignment layer 272 for aligning the liquid crystal layer 260 are formed on surfaces of the first electrode 255 and the second electrode 275 facing each other.

The second polarization layer 290 is formed on a top surface of the second substrate 280. The second polarization layer 290 acts as an absorbent polarization layer. To this end, the second polarization layer 290 may include a phase shift layer. A protective film 295 is formed on the second polarization layer 290 in order to prevent damage from an external shock.

A spacer 265 maintaining a space for the liquid crystal layer 260 is formed between the color filter layer 285 and the planarization layer 250.

Although the liquid crystal display panel 200 shown in FIG. 2 is a thin film transistor (TFT) liquid crystal display (LCD) panel, the present invention is not limited thereto.

The operating principle of the liquid crystal display apparatus 100 will now be explained in brief. A potential difference is generated between the first electrode 255 and the second electrode 275 due to an external signal controlled by the gate electrode 233, the source electrode 235, and the drain electrode 236, the alignment of the liquid crystal layer 260 is determined by the potential difference, and visible light supplied by the backlight unit 300 is blocked or transmitted depending on the alignment of the liquid crystal layer 260. When light emitted by the backlight unit 300 is transmitted through the color filter layer 285, a color image is created.

The first polarization layer 220 of the liquid crystal display apparatus 100 of FIG. 1 is disposed between the backlight unit 300 and the liquid crystal layer 260. The first polarization layer 220 has the absorbent surface 221 facing the liquid crystal layer 260. Accordingly, during an operation of the liquid crystal display apparatus 100, external light incident through the liquid crystal layer 260 reaches the first polarization layer 220.

The absorbent surface 221 of the first polarization layer 220 prevents the external light from being reflected by the first polarization layer 220, thereby improving the contrast of the liquid crystal display apparatus 100. Also, the first polarization layer 220 has the reflective surface 222 facing the backlight unit 300.

Light emitted by the backlight unit 300 tends to randomly transmit to directions. That is, some of the light rays emitted by the backlight unit 300 travel toward the liquid crystal layer 260, and other of the light rays emitted by the backlight unit 300 travels away from the liquid crystal layer 260. As the amount of light traveling away from the liquid crystal layer 260 increases, light efficiency may decrease.

However, in the liquid crystal display apparatus 100 of FIG. 1, even though some of the light beams emitted by the backlight unit 300 travels away from the liquid crystal layer 260, some of the light traveling away are reflected from the reflective layer 320 and travels to the liquid crystal layer 260, thereby preventing a reduction in light efficiency.

When light emitted by the backlight unit 300 reaches the first polarization layer 220 while traveling toward the liquid crystal layer 260, a component of the light which vibrates along a transmission axis of the first polarization layer 220, among other components of the light vibrating along other axes, transmits through the first polarization layer 220 toward the liquid crystal layer 260.

On the other hand, a component of the light, which vibrates along a reflection axis of the first polarization layer 220 that is perpendicular to the transmission axis of the first polarization layer 220, is reflected from the first polarization layer 220. The light reflected from the first polarization layer 220 is transformed into circularly polarized light rotating in one direction while passing through the quarter wavelength retardation layer 310. The circularly polarized light rotating in one direction is reflected by the reflective layer 320, and is transformed into circularly polarized light rotating in the opposite direction. The circularly polarized light rotating in the opposite direction is transformed into linearly polarized light that vibrates along the transmission axis of the first polarization layer 220 while passing through the quarter wavelength retardation layer 310, and thus transmits through the first polarization layer 220 to the liquid crystal layer 260.

Since the light emitted by the backlight unit 300 is recycled and mostly directed to the liquid crystal layer 260, light efficiency can be improved. Also, since the first polarization layer 220 has the absorbent surface 221 and the reflective surface 222, the reflection of external light can be prevented and the efficiency of the backlight unit 300 can be improved. Since the first polarization layer 220 has the absorbent surface 221 and the reflective surface 222, an absorbent polarization layer and a reflective polarization layer do not need to be additionally formed.

Figure 4:
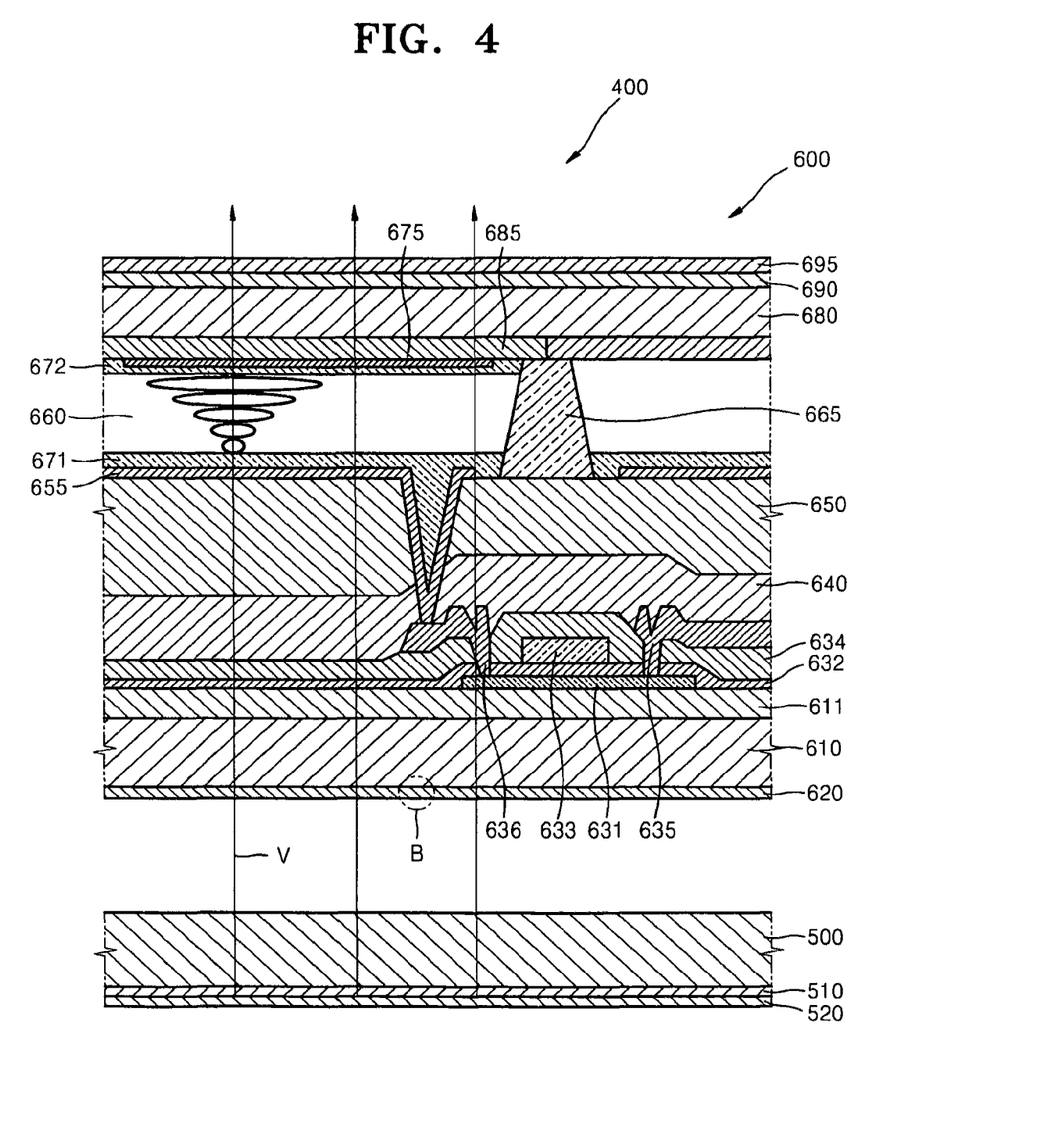
FIG. 4 is a cross-sectional view of a liquid crystal display apparatus according to another embodiment of the present invention.
Figure 5:
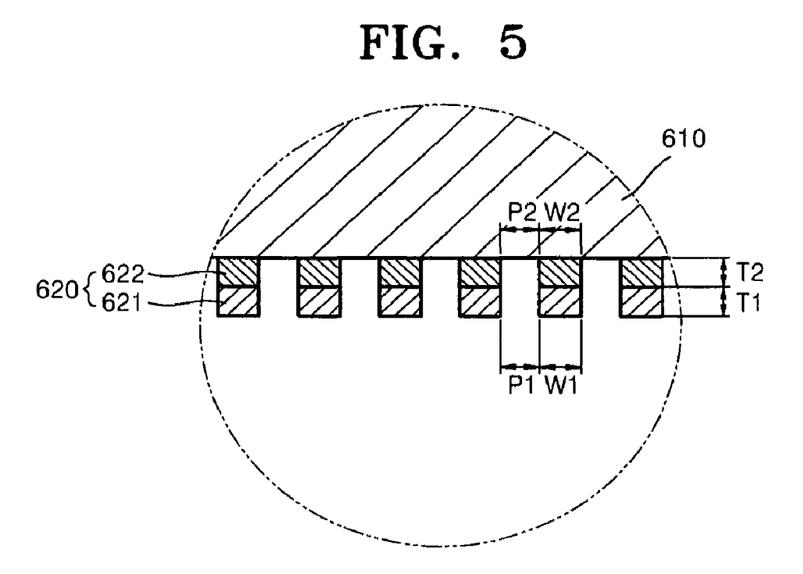
FIG. 5 is an enlarged view of portion B of FIG. 4.
Figure 6:
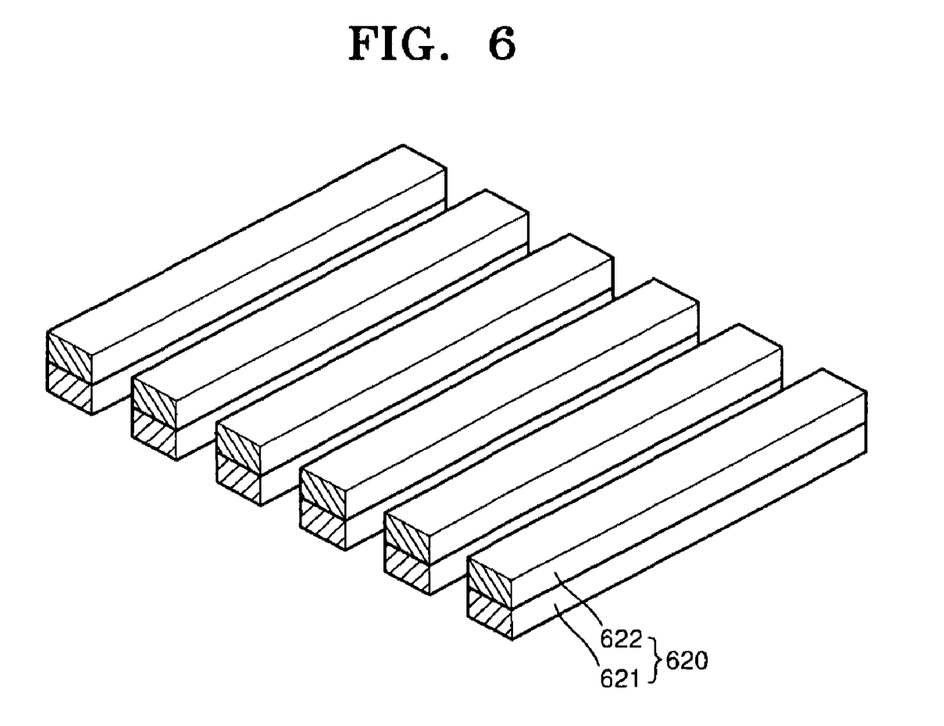
FIG. 6 is a perspective view illustrating a first polarization layer of the liquid crystal display apparatus of FIG. 4.

FIG. 4 is a cross-sectional view of a liquid crystal display apparatus 400 according to another embodiment of the present invention. FIG. 5 is an enlarged view of portion B of FIG. 4. FIG. 6 is a perspective view illustrating a first polarization layer 620 of the liquid crystal display apparatus 400 of FIG. 4. For convenience, an explanation will be focused on a difference between the liquid crystal display apparatus 100 of FIG. 1 and the liquid crystal display apparatus 400 of FIG. 4. The same reference numeral denotes the same element.

Referring to FIG. 4, the liquid crystal display apparatus 400 includes a backlight unit 500, a liquid crystal layer 660, the first polarization layer 620, and a second polarization layer 690. Referring to FIG. 4, the liquid crystal display apparatus 400 can be described to include a liquid crystal display panel 600 and the backlight unit 500.

A reflective layer 520 is disposed on a surface of the backlight unit 500 opposite to a surface of the backlight unit 500 facing the liquid crystal layer 260. A quarter wavelength retardation layer 510 is disposed between the reflective layer 520 and the backlight unit 500.

The liquid crystal display panel 600 includes the liquid crystal layer 660, and the first polarization layer 620 and the second polarization layer 690 disposed on each end of the liquid crystal layer 660, respectively.

The liquid crystal display panel 600 includes a first substrate 610. The first polarization layer 620 is formed on a surface of the first substrate 610 facing the backlight unit 500. A detailed construction of the first polarization layer 620 is illustrated in FIG. 5 that is an enlarged view of portion B of FIG. 4.

The first polarization layer 620 includes a plurality of grids 621 and a plurality of absorbing members 622. Each of the grids 621 includes a metal that reflects light. The grids 621 are arranged to face the backlight unit 500, and the absorbing members 622 are arranged to face the liquid crystal layer 660. In general, the absorbing members are arranged closer than the grids to the liquid crystal layer. Referring to FIG. 5, the absorbing members 622 are disposed between the first substrate 610 and the grids 621.

The grids 621 are formed by arranging conductive lines in parallel to polarize specific wavelengths of electromagnetic waves. Each of the grids 621 may be formed of a conductor such as aluminum, silver, or chrome. The grids 621 are arranged at intervals. A pitch P1, which is an interval between two grids 621, is an important factor determining the performance of the grids 621. If the pitch P1 of the grids 621 is greater than the wavelength of incident light, the grids 621 act as a diffraction grating rather than as a polarizer. On the contrary, if the pitch P1 of the grids 621 is smaller than the wavelength of incident light, the grids 621 mainly act as a polarizer.

The first polarization layer 620 includes the absorbing members 622. Referring to FIG. 5, the absorbing members 622 are formed between the grids 621 and the first substrate 610. The thickness T2 of each of the absorbing members 622 may be different from the thickness T1 of the grids 621, and a pitch P2 of the absorbing members 622, which is an interval between two absorbing members 622, may be the same as the pitch P1 of the grids 621. The absorbing members 622 may be formed of a material having a low reflectance.

Each of the absorbing members 622 may be formed of any of various materials including cadmium selenide (CdSe), cadmium telluride (CdTe), and ruthenium. Each of the absorbing members 622 may include a dielectric material, and a mixture of the dielectric material and the metal.

Figure 7:
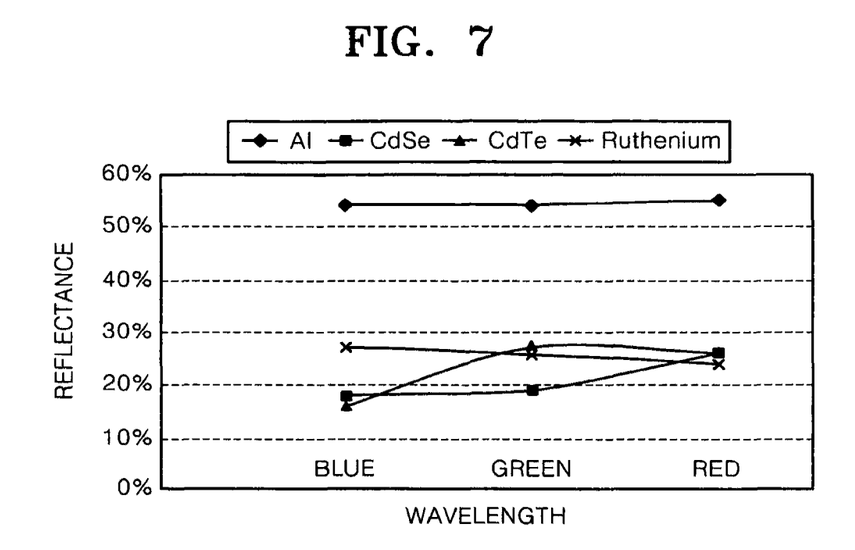
FIG. 7 is a graph illustrating a relationship between the wavelength of visible light and the reflectance of each of materials of the first polarization layer of the liquid crystal display apparatus of FIG. 4.
Figure 8:
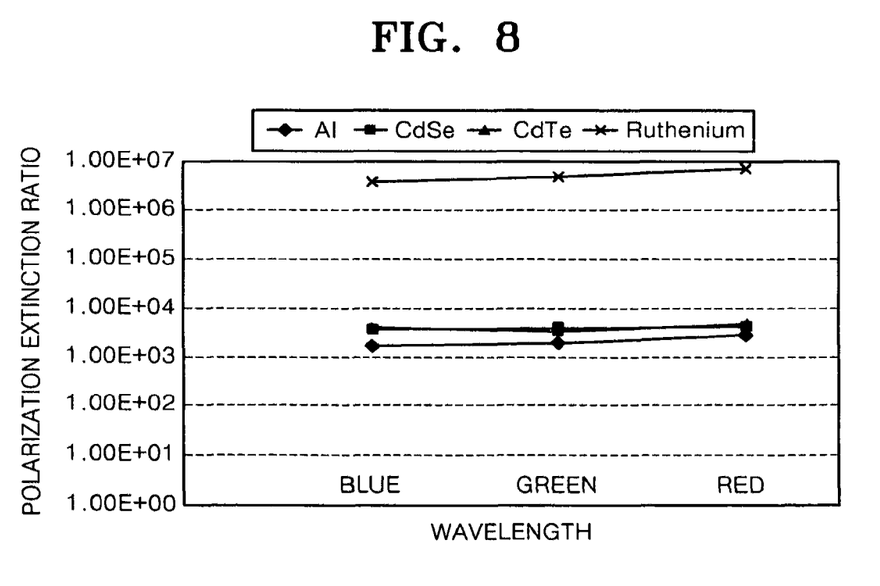
FIG. 8 is a graph illustrating a relationship between the wavelength of visible light and the polarization extinction ratio of each of materials of the first polarization layer of the liquid crystal display apparatus of FIG. 1.

These materials have good properties for the absorbing members 622. Among the materials, the properties of CdSe, CdTe, and ruthenium were measured, and measurement results are shown in graphs of FIGS. 7 and 8. FIG. 7 is a graph illustrating the reflectance of each of materials as a function of a wavelength of visible light. FIG. 8 is a graph illustrating the polarization extinction ratio of each of materials as a function of a wavelength of visible light.

In order to obtain the results shown in FIGS. 7 and 8, the first polarization layer 620 was constructed as described with reference to FIGS. 7 and 8, and the first polarization layer 620 was examined. The grids 621 had a pitch P1 of 100 nanometers, a width W1 of 50 nanometers, and a thickness T1 of 100 nanometers. The absorbing members 622 had a pitch P2 of 100 nanometers, a width W2 of 50 nanometers, and a thickness T2 of 100 nanometers.

In FIG. 7, the horizontal axis represents a wavelength of visible light and the vertical axis represents the reflectance of each material. Referring to FIG. 7, aluminum has a reflectance of higher than 50% in wavelengths of blue, green, and red light. However, CdSe, CdTe, and ruthenium, which are used to form the absorbing members 622 included in the first polarization layer 620 of the liquid crystal display apparatus 400 of FIG. 4, have a reflectance lower than 30%, which is much lower than that of aluminum. Table 1 shows data of FIG. 7.

TABLE 1

| | Reflectance (%) | | | |
|---|---|---|---|---|
| | Al | CdSe | CdTe | Ruthenium |
| Blue | 54 | 18 | 16 | 27 |
| Green | 54 | 19 | 27 | 26 |
| Red | 55 | 26 | 26 | 24 |

As shown in Table 1, each of CdSe, CdTe, and Ruthenium has a reflectance of 30% or less in the wavelengths of blue, green, and red light.

Referring to FIG. 8, each of CdSe, CdTe, and Ruthenium is also superior to aluminum in terms of a polarization extinction ratio. In FIG. 8, the horizontal axis represents a wavelength of visible light, and the vertical axis represents the polarization extinction ratio of each material. A polarization extinction ratio refers to a ratio of the optical power of an incident S wave to the optical power of a transmitted S wave when S-polarized light is incident. As a polarization extinction ratio increases, polarization performance increases. Table 2 shows data of FIG. 8.

TABLE 2

| | Polarization extinction ratio | | | |
|---|---|---|---|---|
| | Al | CdSe | CdTe | Ruthenium |
| Blue | 1.60E+03 | 3.67E+03 | 3.99E+03 | 3.91E+06 |
| Green | 1.90E+03 | 4.08E+03 | 3.55E+03 | 5.13E+06 |
| Red | 2.97E+03 | 4.26E+03 | 4.93E+03 | 7.20E+06 |

As shown in Table 2, each of CdSe and CdTe has a polarization extinction ratio about twice greater than that of aluminum, and ruthenium has a polarization extinction ratio about 1000 times greater than that of aluminum.

As described above with reference to FIG. 5, each of the absorbing members 622 may include a dielectric material. Each of the absorbing members 622 may include any of various dielectric materials including an organic material or an inorganic material. Each of the absorbing members 622 may be formed of an inorganic material such as SiOx (x≧1), SiNx (x≧1), MgF$_2$, CaF$_2$, Al$_2$O$_3$, SnO$_2$, indium tin oxide (ITO), indium zinc oxide (IZO), ZnO, In$_2$O$_3$, Cr$_2$O$_3$, Ag$_2$O, TiO$_2$, Ta$_2$O$_5$, HfO$_2$, or a nitride.

Each of the absorbing members 622 may be formed of an organic material such as polyethylene (PE), polypropylene (PP), polystyrene(PS), polyethylene terephthalate (PET or PETE), polyamide(PA), polyester, polyvinyl chloride (PVC), polycarbonate (PC), acrylonitrile butadiene styrene (ABS), polyvinylidene chloride (PVDC), polytetrafluoroethylene (PTFE), polymethyl methacrylate (PMMA), polylactic acid (PLA), or polyurethane (PU). Each of the absorbing members 622 may be formed of a low molecular organic material such as copper phthalocyanine (CuPc), N,N'-Di(naphthalene-1-yl)-N,N'-diphenyl-benzidine (NPB), or tris-8-hydroxyquinoline aluminum) (Alq3).

Each of the absorbing members 622 may include a metal, and a mixture of the metal and the dielectric material. That is, low reflective members having a low reflectance and a high absorption coefficient may be formed by co-depositing a metal and a dielectric material to form a mixture. Examples of the metal may include Fe, Co, V, Ti, Al, Ag, Si, Cr, Mo, Ge, Y, Zn, Zr, W, Ta, Cu, and Pt. Examples of the dielectric material that is mixed with the metal may include an organic material, an inorganic material, or a compound of the organic material and the inorganic material.

Examples of the inorganic material that is mixed with the metal may include SiOx (x≧1), SiNx (x≧1), MgF$_2$, CaF$_2$, Al$_2$O$_3$, SnO$_2$, ITO, IZO, ZnO, In$_2$O$_3$, Cr$_2$O$_3$, Ag$_2$O, TiO$_2$, Ta$_2$O$_5$, HfO$_2$, and a nitride.

Examples of the organic material that is mixed with the metal may include a high molecular material such as PE, PP, PS, PET or PETE, PA, polyester, PVC, PC, ABS, PVDC, PTFE, PMMA, PLA, or PU, or a low molecular organic material such as CuPc, NPB, or Alq3. Each of the absorbing members 622 may be formed by mixing a compound of the organic materials and the inorganic materials with the metal.

The absorbing members 622 are formed on the grids 621 and cover top surfaces of the grids 621 as shown in FIG. 5. That is, when external light is incident on the first polarization layer 620, the absorbing members 622 prevent the external light from being reflected from the grids 621 formed of a metal. To this end, the width W2 of the absorbing members 622 may be the same as the width W1 of the grids 621.

The first polarization layer 620 is patterned such that the grids 621 and the absorbing members 622 are linearly arranged at predetermined intervals as shown in FIG. 6. Although not shown, the first polarization layer 620 of FIG. 6 can be easily formed by coating the first substrate 610 with a material to form the absorbing members 622, by coating the absorbing member-coated first substrate with a material to from the grids 621, and by performing a patterning process using a mask.

Alternatively, the first polarization layer 620 may be formed by forming a material on the backlight unit 500 to form the grids 621, by forming a material to form the absorbing members 622, and by performing a patterning process.

A buffer layer 611 is formed on a surface of the first substrate 610 opposite to the surface of the first substrate 610 on which the first polarization layer 620 is formed. An active layer 631 is formed in a predetermined pattern on the buffer layer 611. A gate insulating layer 632 is formed on the active layer 631. A gate electrode 633 is formed in a predetermined pattern on the gate insulating layer 632.

An inter-layer insulating layer 634 is formed on the gate electrode 633. Next, contact holes are formed, and a source electrode 635 and a drain electrode 636 are formed such that the source electrode 635 and the drain electrode 636 are electrically connected to the active layer 631 through the contact holes. A passivation layer 640 is formed to cover the source electrode 635 and the drain electrode 636. A planarization layer 650 is formed on the passivation layer 640. A first electrode 655 is formed in a predetermined pattern such that the first electrode 655 is electrically connected to the source electrode 635 or the drain electrode 636.

A second substrate 680 is disposed to face the first substrate 610. The liquid crystal layer 660 is disposed between the first substrate 610 and the second substrate 680. A color filter layer 685 is formed on a bottom surface of the second substrate 680. A second electrode 675 is formed on a bottom surface of the color filter layer 685. A first alignment layer 671 and a second alignment layer 672 aligning the liquid crystal layer 660 are formed on surfaces of the first electrode 655 and the second electrode 675 facing each other.

The second polarization layer 690 is formed on a top surface of the second substrate 680. The second polarization layer 690 acts as an absorbent polarization layer. To this end, the second polarization layer 690 may include a phase shift layer. A protective film 695 is formed on the second polarization layer 690. A spacer 665 maintaining a space for the liquid crystal layer 660 is formed between the color filter layer 685 and the planarization layer 650.

The first polarization layer 620 of the liquid crystal display apparatus 400 of FIG. 4 is disposed between the backlight unit 500 and the liquid crystal layer 660. The first polarization layer 620 includes the absorbing members 622 facing the liquid crystal layer 260.

Accordingly, during the operation of the liquid crystal display apparatus 400, external light incident through the liquid crystal layer 660 reaches the first polarization layer 620. The absorbing members 622 of the first polarization layer 620 prevent the external light from being reflected from the first polarization layer 620, thereby improving the contrast of the liquid crystal display apparatus 400.

Also, the first polarization layer 620 has the grids 621, each of which includes a metal and faces the backlight unit 500. Light emitted by the backlight unit 500 is reflected from the grids 621, and then is reflected again by the reflective layer 520, thereby improving light efficiency and brightness.

In detail, when light emitted by the backlight unit 500 reaches the first polarization layer 620 while traveling toward the liquid crystal layer 660, a component of the light which vibrates along a transmission axis of the first polarization layer 620, among components of the light vibrating along other axes, is transmitted through the first polarization layer 620 to the liquid crystal layer 660.

On the other hand, a component of the light, which vibrates along a reflection axis of the first polarization layer 620 that is perpendicular to the transmission axis of the first polarization layer 620, is reflected from the first polarization layer 620. The light reflected from the first polarization layer 620 is transformed into circularly polarized light rotating in one direction while passing through the quarter wavelength retardation layer 510. The circularly polarized light rotating in one direction is reflected by the reflective layer 520, and is transformed into circularly polarized light rotating in the opposite direction. The circularly rotating light rotating in the opposite direction is transformed into linearly polarized light that vibrates along the transmission axis of the first polarization layer 620, and thus transmits through the first polarization layer 620 to the liquid crystal layer 660.

Since the light emitted by the backlight unit is recycled and mostly directed to the liquid crystal layer 660, light efficiency can be improved.

In particular, light emitted by the backlight unit 500 tends to randomly spread out in directions. However, in the liquid crystal display apparatus 400 of FIG. 4, even though some of the light beams emitted by the backlight unit 500 travel away from the liquid crystal layer 660, the light beams are again reflected from the reflective layer 520, thereby preventing a reduction in light efficiency.

Figure 9:
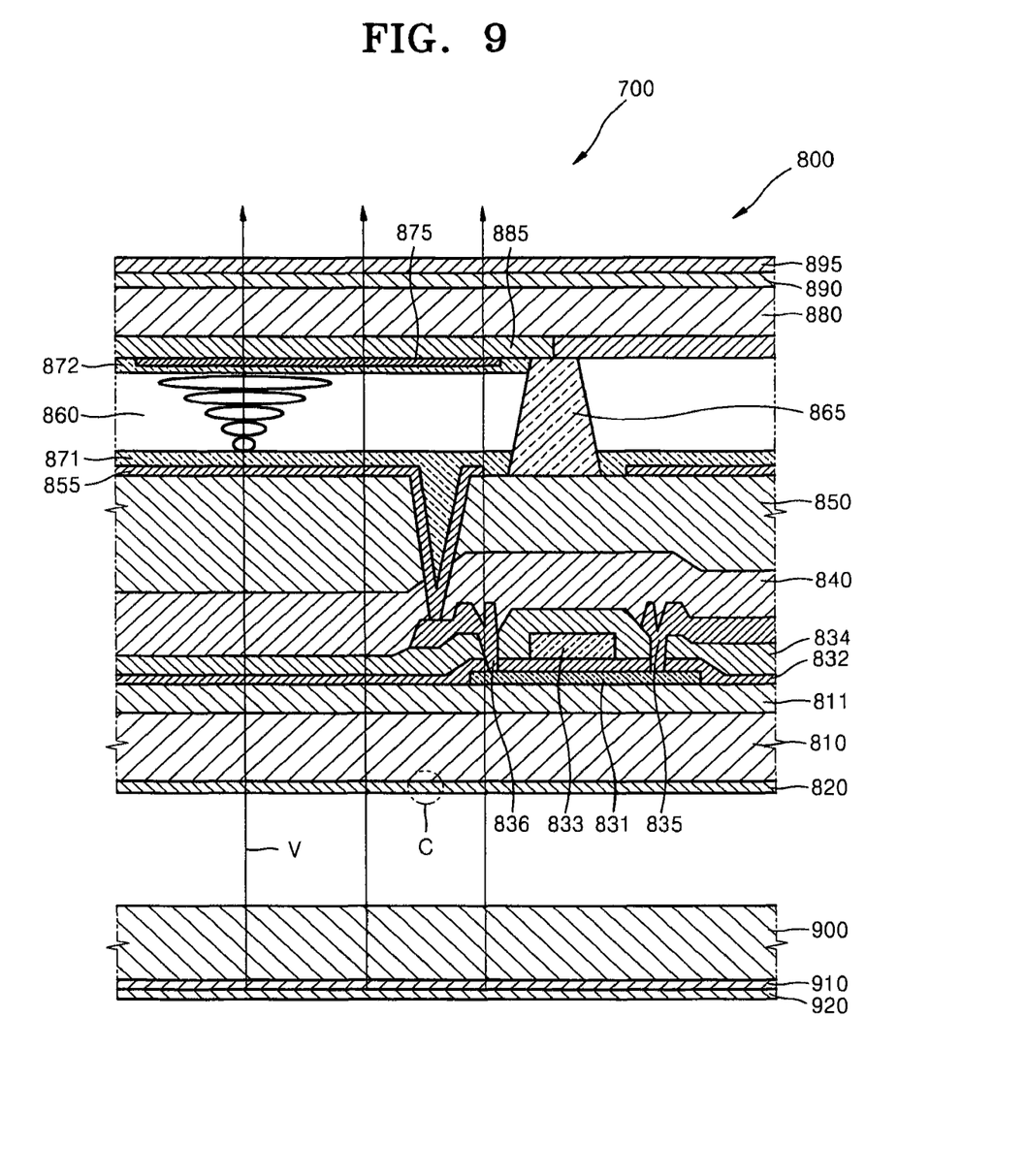
FIG. 9 is a cross-sectional view of a liquid crystal display apparatus according to another embodiment of the present invention.
Figure 10:
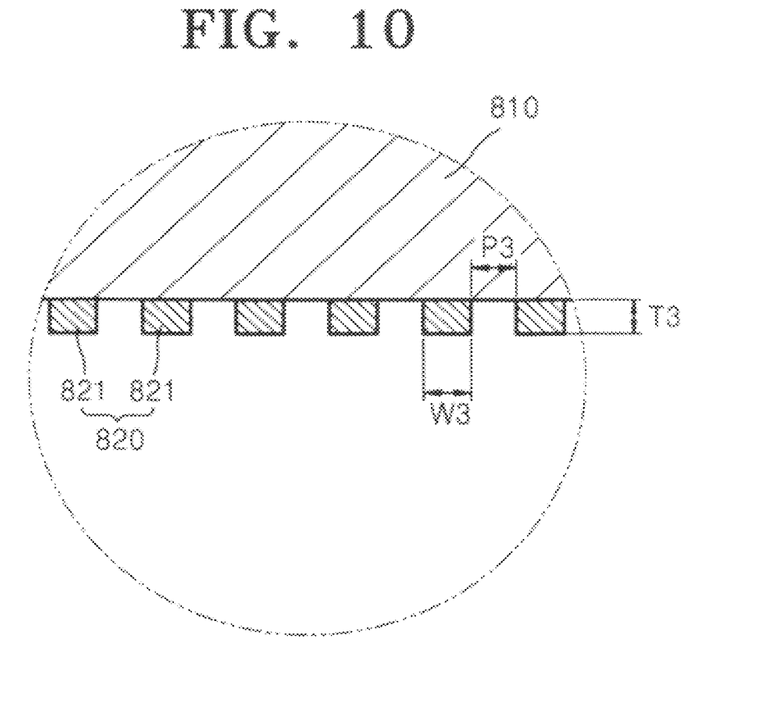
FIG. 10 is an enlarged view of portion C of the liquid crystal display apparatus of FIG. 9.
Figure 11:
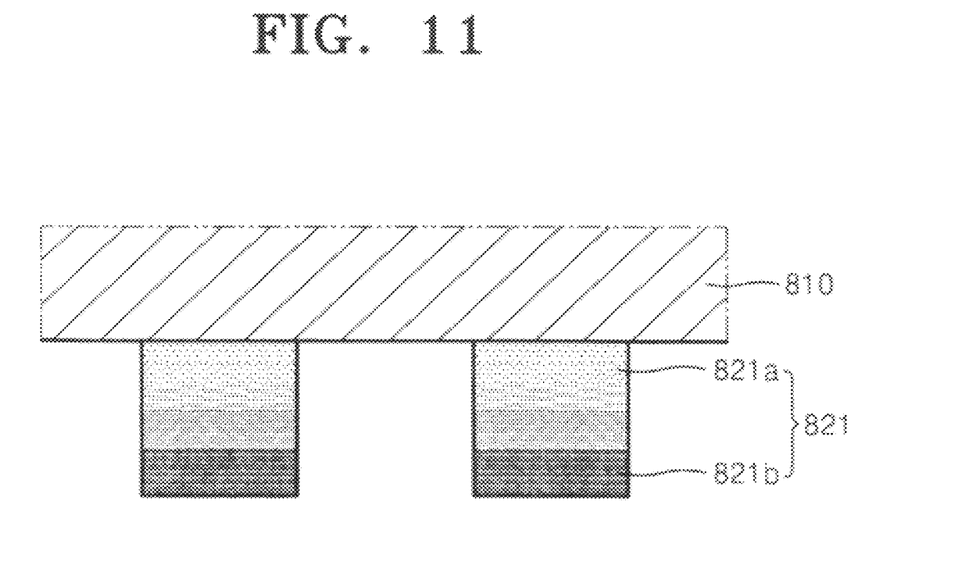
FIG. 11 is an enlarged view of grids of portion C of FIG. 10.
Figure 12:
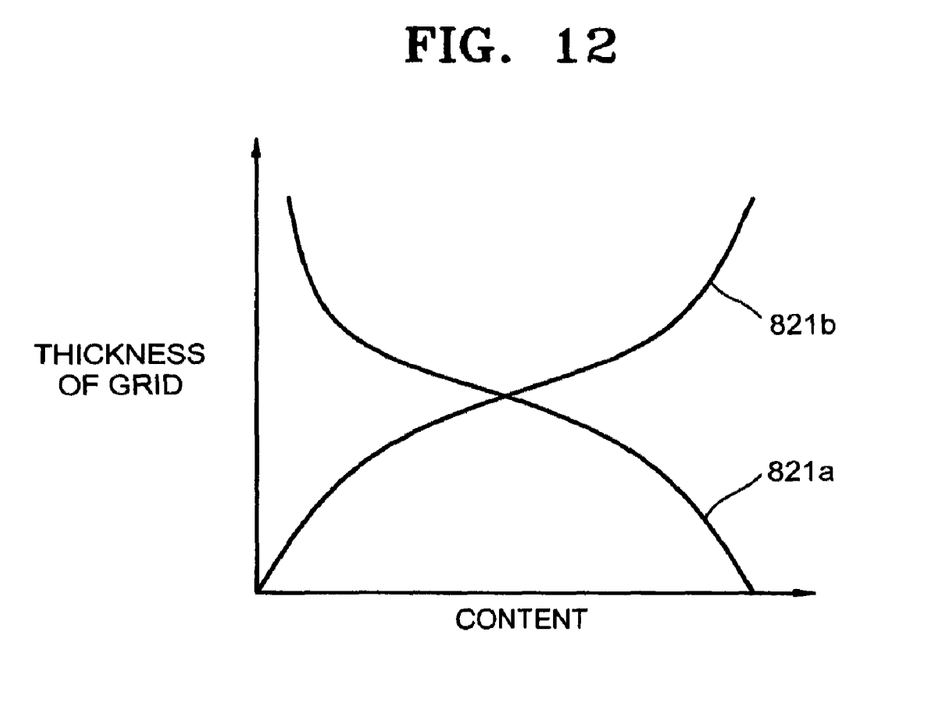
FIG. 12 is a graph illustrating a relationship between the content of each of a first component and a second component and the thickness of each of the grids of FIG. 10.

FIG. 9 is a cross-sectional view of a liquid crystal display apparatus 700 according to another embodiment of the present invention. FIG. 10 is an enlarged view of portion C of the liquid crystal display apparatus 700 of FIG. 9. FIG. 11 is an enlarged view of a plurality of grids 821 of portion C of FIG. 10. FIG. 12 is a graph illustrating the content of each of a first component and a second component as a function of the thickness of each of the grids 821 of FIG. 10.

For convenience, an explanation will be focused on a difference between the liquid crystal display apparatuses 100 and 400 of FIGS. 1 and 4 and the liquid crystal display apparatus 700 of FIG. 9.

Referring to FIG. 9, the liquid crystal display apparatus 700 includes a backlight unit 900, a liquid crystal layer 860, a first polarization layer 820, and a second polarization layer 890. Referring to FIG. 9, the liquid crystal display apparatus 700 can be described to include a liquid crystal display panel 800 and the backlight unit 900.

A reflective layer 920 is disposed on a surface of the backlight unit 900 opposite to a surface of the backlight unit 900 facing the liquid crystal layer 860. A quarter wavelength retardation layer 910 is disposed between the reflective layer 920 and the backlight unit 900.

The liquid crystal display panel 800 includes the liquid crystal layer 860, and the first polarization layer 820 and the second polarization layer 890 disposed on both ends of the liquid crystal layer 860.

The liquid crystal display panel 800 includes a first substrate 810. The first polarization layer 820 is formed on a surface of the first substrate 810 facing the backlight unit 900. A detailed construction of the first polarization layer 820 is illustrated in FIG. 10 that is an enlarged view of portion C of FIG. 9.

The first polarization layer 820 includes the plurality of grids 821. The grids 821 may be patterned into stripes that are arranged at predetermined intervals.

A pitch P3 of the grids 821 is an important factor in determining the performance of the grids 821. If the pitch P3 of the grids 821 is greater than the wavelength of incident light, the grids 821 act as a diffraction grating rather than as a polarizer. On the contrary, if the pitch P3 of the grids 821 is smaller than the wavelength of incident light, the grids 821 mainly act as a polarizer.

In order to work as a polarizer for visible light, the grids 621 may have a width W3 of 100 to 500 nanometers and a thickness T3 of 300 to 500 nanometers.

Each of the grids 821 includes a first component 821a and a second component 821b. A detailed construction of each of the grids 821 is illustrated in FIG. 11 that is an enlarged view of the grids 821 portion of FIG. 10. The first component 821a includes a dielectric material, and the second component 821b includes a metal. The content of the first component 821a increases while proceeding toward the liquid crystal layer 860. The content of the second component 821b increases while proceeding toward the backlight unit 900.

The first component 821a may be formed of an insulating transparent material such as $SiO_x$ ($x \geq 1$), $SiN_x$ ($x \geq 1$), $MgF_2$, $CaF_2$, $Al_2O_3$, or $SnO_2$. The first component 821a may of a conductive transparent material such as ITO, IZO, ZnO, or $In_2O_3$. The second component 821b includes a metal. The second component 821b may be formed of Fe, Co, V, Ti, Al, Ag, Si, Cr, Mo, Ge, Y, Zn, Zr, W, Ta, Cu, or Pt. Each of the grids 821 has a concentration gradient such that the first component 821a is more concentrated near the liquid crystal layer 860 and the second component 821*b* is more concentrated near the backlight unit 900.

As shown in FIGS. 11 and 12, the content of the first component 821*a* increases as proceeding toward the first substrate 810, and the content of the second component 821*b* increases as proceeding away from the first substrate 810. That is, the first component 821*a* is more concentrated at a location near to the first substrate 810, and the second component 821*b* is more concentrated at a location far from the first substrate 810. External light is incident on the first polarization layer 820 through the liquid crystal layer 860. The content of the first component 821*a*, which is formed of a dielectric material, of each of the grids 821 of the first polarization layer 820 increases as proceeding toward the external light. That is, a ratio of a transparent material to an opaque metal in each of the grids 821 increases gradually while proceeding toward the first substrate 810, specifically, toward the liquid crystal layer 860, thereby preventing an interfacial reflection that may be caused by a difference of refractive indices. Accordingly, when external light is incident on the grids 821, the grids 821 absorbs the external light, thereby preventing the reflection of the external light.

Co-deposition or the like may be used to form the grids 821 having a concentration gradient. When the grids 821 are formed by co-deposition, deposition rates of the first component 821*a* and the content of the second component 821*b* can be adjusted with respect to time so that the content of the first component 821*a* is inversely proportional to the content of the second component 821*b*.

A buffer layer 811 is formed on a surface of the first substrate 810 opposite to the surface of the first substrate 810 on which the first polarization layer 820 is formed. An active layer 831 is formed in a predetermined pattern on the buffer layer 811. A gate insulating layer 832 is formed on the active layer 831. A gate electrode 833 is formed in a predetermined pattern on the gate insulating layer 832.

An inter-layer insulating layer 834 is formed on the gate electrode 833. Next, contact holes are formed, and a source electrode 835 and a drain electrode 836 are formed such that the source electrode 835 and the drain electrode 836 are electrically connected to the active layer 831 through the contact holes. A passivation layer 840 is formed to cover the source electrode 835 and the drain electrode 836. A planarization layer 850 is formed on the passivation layer 840. A first electrode 855 is formed in a predetermined pattern such that the first electrode 855 is electrically connected to the source electrode 835 or the drain electrode 836.

A second substrate 880 is disposed to face the first substrate 810. The liquid crystal layer 860 is disposed between the first substrate 810 and the second substrate 880. A color filter layer 885 is formed on a bottom surface of the second substrate 880. A second electrode 875 is formed on a bottom surface of the color filter layer 885. A first alignment layer 871 and a second alignment layer 872 aligning the liquid crystal layer 860 are formed on surfaces of the first electrode 855 and the second electrode 875 facing each other.

The second polarization layer 890 is formed on a top surface of the second substrate 880. The second polarization layer 890 acts as an absorbent polarization layer 890. To this end, the second polarization layer 890 may include a phase shift layer. A protective film 895 is formed on the second polarization layer 890. A spacer 865 maintaining a space for the liquid crystal layer 860 is formed between the color filter layer 885 and the planarization layer 850.

The first polarization layer 820 of the liquid crystal display apparatus 700 of FIG. 9 is disposed between the backlight unit 900 and the liquid crystal layer 860. The first polarization layer 820 includes the plurality of grids 821. Each of the grids 821 includes the first component 821*a* and the second component 821*b*.

Accordingly, during the operation of the liquid crystal display apparatus 700, external light incident through the liquid crystal layer 860 reaches the first polarization layer 820. A content ratio of a transparent material to an opaque metal in each of the grids 821 increases gradually while proceeding toward the liquid crystal layer 860, thereby preventing an interfacial reflection that may be caused by a difference of refractive indeces. Thus, when external light is incident on the grids 821, the grids 821 absorb the external light, thereby preventing the reflection of the external light and improving contrast.

Also, a ratio of an opaque metal to a transparent material increases gradually while proceeding toward the backlight unit 900. Accordingly, light emitted by the backlight unit 900 is reflected by the grids 821, and then is reflected again by the reflective layer 920, thereby improving light efficiency and brightness.

Light emitted by the backlight unit 900 tends to randomly travel in directions. That is, some of the light rays emitted by the backlight unit 900 travel toward the liquid crystal layer 860 and the other of the light rays emitted by the backlight unit 900 travels away from the liquid crystal layer 860. As the amount of light rays traveling away from the liquid crystal layer 860 increases, light efficiency may decrease. However, in the liquid crystal display apparatus 700 of FIG. 9, even though some of the light rays emitted by the backlight unit 900 travels away from the liquid crystal layer 860, the light is reflected from the reflective layer 920 toward the liquid crystal layer 860, thereby preventing a reduction in light efficiency.

In detail, when light emitted by the backlight unit 900 reaches the first polarization layer 820 while traveling toward the liquid crystal layer 860, a component of the light which vibrates along a transmission axis of the first polarization layer 820, among other components of the light vibrating along other axes, transmits through the first polarization layer 820 to the liquid crystal layer 860.

On the other hand, a component of the light, which vibrates along a reflection axis of the first polarization layer 820 that is perpendicular to the transmission axis of the first polarization layer 820, is reflected by the first polarization layer 820. The light reflected by the polarization layer 820 is transformed into circularly polarized light rotating in one direction while passing through the quarter wavelength retardation layer 910. The circularly polarized light rotating in one direction is reflected by the reflective layer 920, and is transformed into circularly polarized light rotating in the opposite direction. The circularly polarized light rotating in the opposite direction is transformed into linearly polarized light that vibrates along the transmission axis of the first polarization layer 820 while passing through the quarter wavelength retardation layer 910, and thus transmits through the first polarization layer 820 to the liquid crystal layer 860.

Since the light emitted by the backlight unit 900 is recycled and mostly directed to the liquid crystal layer 860, light efficiency can be improved.

Also, since each of the grids 821 of the first polarization layer 820 has a concentration gradient such that the content of the first component 821*a* acing as an absorbing member increases while proceeding toward the liquid crystal layer 860 and the content of the second component 821*b* acting as a reflecting member increases while proceeding toward the backlight unit 900, the reflection of external light can be prevented and the efficiency of the backlight unit 900 can be improved. Since the first polarization layer 820 includes the grids 821, each of which includes the first component 821a acting as the absorbing member and the second component 821b acting as the reflecting member, additionally forming an absorbent polarization layer and a reflective polarization layer may not be necessary.

As described above, the liquid crystal display apparatus according to the present invention can prevent the reflection of external light and can improve contrast and visibility by disposing a polarization layer having a reflective surface and an absorbent surface between a liquid crystal layer and a backlight unit, and can improve brightness by improving the efficiency of the backlight unit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display apparatus comprising:
   a backlight unit;
   a second polarization layer;
   a liquid crystal layer disposed between the backlight unit and the second polarization layer; and
   a first polarization layer disposed between the backlight unit and the liquid crystal layer, the first polarization layer comprising a plurality of grids, each of the grids comprising:
   a first component including a dielectric material, a concentration of the first component increasing while proceeding toward the liquid crystal layer; and
   a second component including a metal, a concentration of the second component increasing while proceeding toward the backlight unit.

2. The liquid crystal display apparatus of claim 1, wherein the first component comprises one selected from the group consisting of SiOx (x≧1), SiNx (x≧1), $MgF_2$, $CaF_2$, $Al_2O_3$, $SnO_2$, ITO (indium tin oxide), IZO (indium zinc oxide), ZnO, and $In_2O_3$.

3. The liquid crystal display apparatus of claim 1, wherein the second component comprises one selected from the group consisting of Fe, Co, V, Ti, Al, Ag, Si, Cr, Mo, Ge, Y, Zn, Zr, W, Ta, Cu, and Pt.

4. The liquid crystal display apparatus of claim 1, wherein the grids are patterned into stripes that are arranged at predetermined intervals.

5. The liquid crystal display apparatus of claim 1, further comprising a reflective layer, the backlight unit disposed between the reflective layer and the first polarization layer.

6. The liquid crystal display apparatus of claim 1, further comprising a quarter wavelength retardation layer disposed between the reflective layer and the backlight unit.

7. The liquid crystal display apparatus of claim 1, wherein the first component comprises one selected from the group consisting of SiNx (x≧1), $MgF_2$, $CaF_2$, $Al_2O_3$, $SnO_2$, ITO (indium tin oxide), IZO (indium zinc oxide), ZnO, and $In_2O_3$.

8. The liquid crystal display apparatus of claim 1, wherein the second component comprises one selected from the group consisting of Al, Ag, Si, Cr, Mo, Ge, Y, Zn, Zr, W, Ta, Cu, and Pt.

* * * * *